Oct. 22, 1963  C. W. DAVIS, JR., ETAL  3,107,463
POLISHING COMPOSITION FEED SYSTEM
Filed Sept. 28, 1960  2 Sheets-Sheet 1
Fig.1
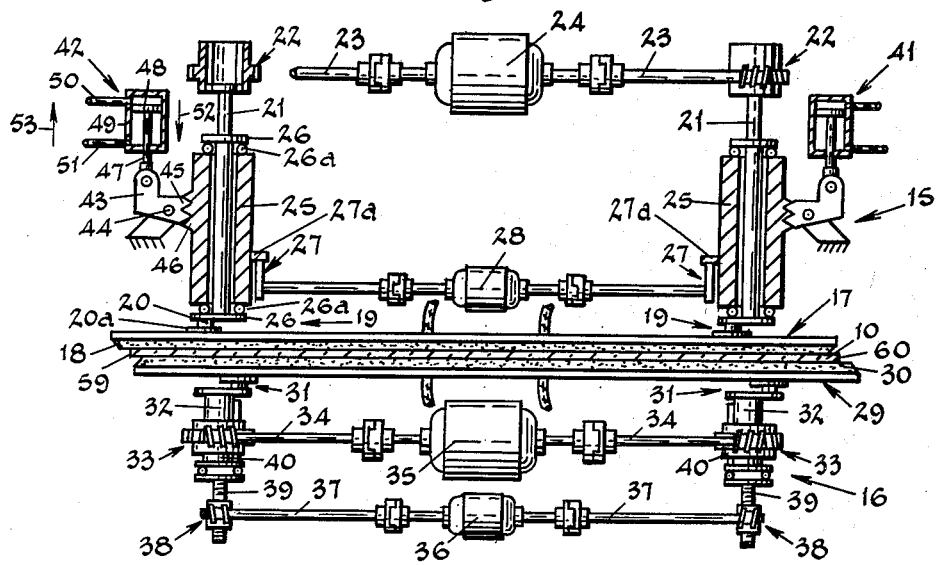
Fig.2
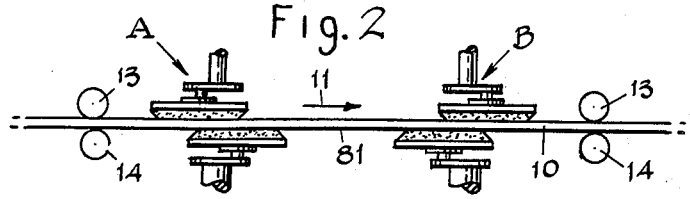
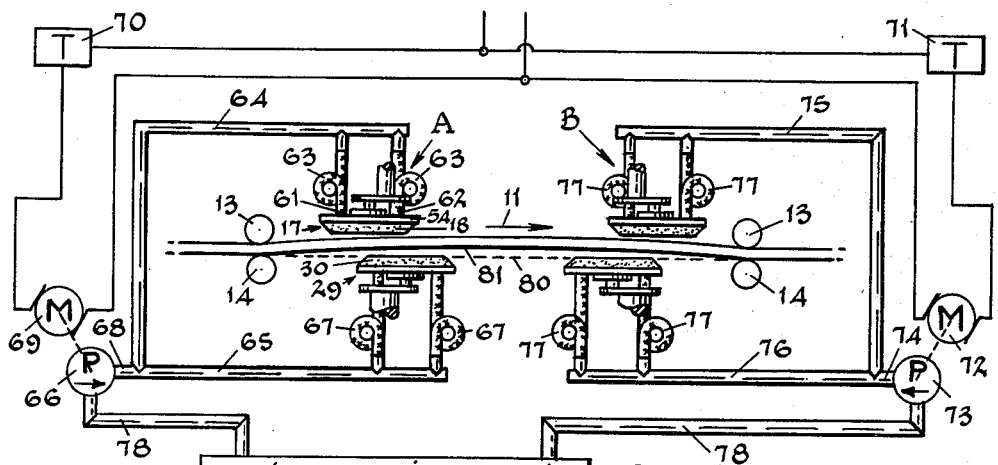
Fig.3
Curtis W. Davis, Jr. INVENTORS
Delmar E. Carney,
BY James F. Kurick and
Daniel A. Schultz
Nobbe & Swope
ATTORNEYS Oct. 22, 1963     C. W. DAVIS, JR., ETAL     3,107,463

POLISHING COMPOSITION FEED SYSTEM

Filed Sept. 28, 1960     2 Sheets-Sheet 2

Curtis W. Davis, Jr. INVENTORS
Delmar E. Carney,
James R. Kurick and
Daniel A. Schultz

BY

Nobbe & Swope
ATTORNEYS

3,107,463
POLISHING COMPOSITION FEED SYSTEM
Curtis W. Davis, Jr., and Delmar E. Carney, Toledo, James F. Kurick, Perrysburg, and Daniel A. Schultz, Rossford, Ohio, assignors to Libbey-Owens-Ford Glass Company, Toledo, Ohio, a corporation of Ohio
Filed Sept. 28, 1960, Ser. No. 58,998
14 Claims. (Cl. 51—283)

This invention broadly relates to a method and apparatus for surfacing glass and is more particularly directed to a method and apparatus for simultaneously polishing both surfaces of a glass ribbon moving along a continuous path.

It has been known that a glass ribbon may be ground and/or polished simultaneously on both surfaces as the continuous ribbon moves along a definite path. This operation has been normally referred to in the prior art as either twin grinding or twin polishing. In the prior art, twin grinding was normally accomplished by a series of opposed circular runners rotating about a centrally disposed runner axis on each side of the glass ribbon. Likewise, the conventional twin polishing devices of the prior art employed a plurality of circular polishing pads freely turnable about their individual axes, all being supported on each side of the glass ribbon from a common frame that was itself rotated about an axis perpendicular to the plane of the glass.

Likewise, it has been known, as shown and described in U.S. Patent No. 1,962,766, issued to J. P. Crowley et al. on June 12, 1934, and also as shown and described in U.S. Patent No. 1,962,767, issued to J. P. Crowley et al. on June 12, 1934, to surface (i.e. grind or polish) the opposed surfaces of a glass ribbon moving along a definite path by a special type of oscillating motion of the surfacing unit, wherein the unit includes upper and lower rectangular surfacing runners. This oscillating or orbital surfacing motion was applied, according to those patents, by rectangular runners whose major dimension was transverse of the path of travel of the glass.

The particular motion of the surfacing tools, typified by the above cited patents, is most aptly defined as a curvilinear translation with respect to the glass. This curvilinear translation is itself most particularly characterized by the fact that the path of each point on the tool describes a circle, which circle is of equal diameter to the circles described by all other points on the same tool.

According to the conventional prior art in which rotating circular runners were employed, and particularly during the grinding process, the distribution of the surfacing slurry to bring the slurry into proper surfacing position between a surfacing runner and the glass, was normally accomplished by inscribing a series of radially spiralling grooves across the runner face. In this case, the slurry would be introduced into the central cavity of the rotating runner and by centrifugal force would be carried along the outwardly spiralling channels so that the slurry would be distributed uniformly across the glass sheet.

In the case of the polishing applicators, the slurry was deposited directly upon the glass and was carried by the glass underneath the polishing felts. Also these polishing felts were circular pads of fairly restricted diameters so that the slurry or polishing rouge actually had to travel only a slight distance underneath the circular pad to reach the pad center and thereby insure uniform distribution of the polishing slurry underneath the pad.

However, with the advent of present polishing procedures wherein rather large rectangular type runners are used to surface the glass, a serious problem has arisen in connection with the proper slurry distribution underneath the entire glass contacting area of the surfacing tool. This problem is magnified in the case of the rectangular shaped polishing pads following a path characterized by a curvilinear translation because it has been found that the pads or polishing runners must be pressed onto the glass surface by some external pressure in order to secure the best polishing action. Thus in effect it could be said, in the case of these rectangular pads or rectangular runners that the glass ribbon is actually pinched between opposed surfacing runners. This being the case, external feeding such as was common heretofore in the case of the circular polishing pads of the prior art has proven unsatisfactory. With the polishing runner positively pressed onto the glass surface, this pressure prevents the glass ribbon from carrying polishing slurry, or rouge deposited on its surface, underneath the full extent of the runner.

It must be remembered that efficient polishing depends to a large extent upon the uniformity of distribution of the polishing slurry over all areas of the glass to be polished. If the slurry distribution should be uneven then the polishing action of polishing tools will be uneven and the resultant glass finish will be characterized by areas of high polish and areas of inferior polish.

In essence it has been found to be critical that these rectangular felt pads used to polish the glass, be impregnated or saturated with the polishing medium. This impregnation of the felt is accomplished to a reasonable depth to insure that the glass engaging portions of the felts are saturated with a fluid polishing medium. This is essential not only to insure uniform polishing of the glass but also to prevent the frictional force from excessively heating either the pad or the glass, which heat would impair the polishing efficiency or under some conditions could cause the glass to break. During polishing the felt tends to dry out due to the frictional heat so that a saturation or impregnation of the pad is desirable as aforediscussed. Thus to an extent the impregnation of the pad by a fluid medium is necessary for its cooling effect along with its use for polishing.

Therefore, broadly expressed, the present invention is directed to a particularly novel method and apparatus for insuring a positive and uniform distribution of slurry to all parts of a rectangular polishing tool pressed onto the glass in order to gain uniform polishing by all of the glass contacting portions of the surfacing tool.

Other objects and advantages of the invention will become more apparent during the course of the following description when taken in connection with the accompanying drawings.

In the drawings wherein like numerals are employed to designate like parts throughout the same:

FIG. 1 is a diagrammatic elevation taken along a line transversely of the path of the glass illustrating a polishing apparatus of the rectangular type;

FIG. 2 is a side elevation showing the polishing position of the surfacing runners;

FIG. 3 is a side elevation showing the slurry distribution system and most particularly the position of the polishing pad during slurry feed phase;

Figure 4:
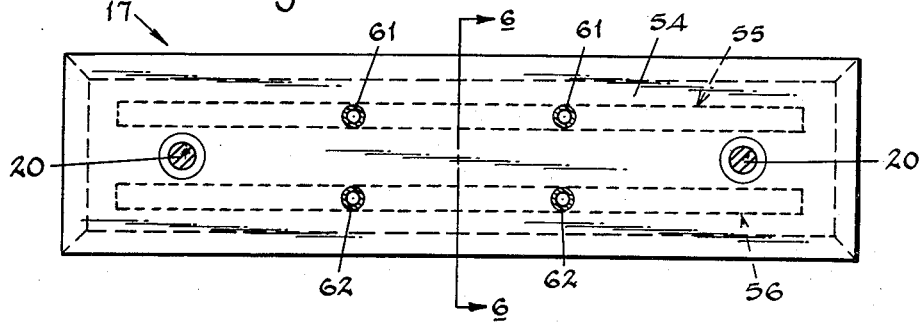
FIG. 4 is a top view of a runner using the polishing method of the present invention.

Turning now to FIGS. 1 and 2, there is shown a glass ribbon 10 being conveyed along in the direction of arrow 11 (FIG. 2) by suitable drive rolls 13 and 14. The glass ribbon 10 is carried through a plurality of similar polishing stations A and B (FIG. 2). Only one of these stations, namely station A is shown in detail (FIG. 1) and inasmuch as stations A and B (FIG. 2) are for all intents and purposes structurally equivalent, there being only a difference in the phasing of the motion of the surfacing tools employed in these stations, it is believed that a description of station A (FIG. 1) will suffice as a description for both stations A and B. It should also be remembered that stations A and B constitute one surfacing unit (FIG. 2) and that any desired number of these units may be located along the path of ribbon 10.

Station A includes an upper surface polishing apparatus 15 and a lower surface polishing apparatus 16 (FIG. 1).

Figure 5:
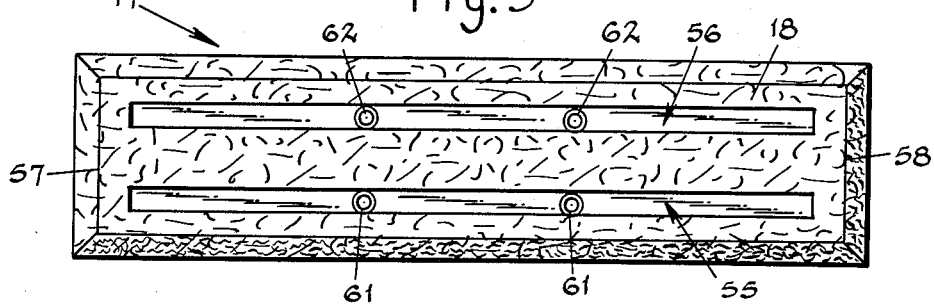
FIG. 5 is a bottom view of the runner shown in FIG. 4.

The upper surfacing apparatus 15 includes a rectangular polishing platen 17 (see also FIGS. 4 and 5). This platen 17 has a felt working face 18 and the platen is driven in its curvilinear translation by eccentric drive mechanisms 19, one secured adjacent each end of platen 17. Each mechanism 19 includes a bell crank or eccentric 20 mounted to platen 17 in bearings 20a and also suitably attached to a shaft 21. Each shaft 21 is connected by a worm gearing system 22 to further shafts 23 which are themselves connected to the drive shafts of motor 24 and rotated thereby in the desired manner. Thus, the upper platen 17 will follow a closed path, namely a curvilinear translation, as the driving force is imparted thereto by the motor 24 through the linkage 20, 21, 22, 23 aforedescribed. Shaft 21 is maintained vertically aligned by a casing 25 and while shaft 21 is freely rotatable within casing 25 in bearings 26a it also is fixedly positioned with respect to the casing 25 by collars 26 and casing 25 is therefore vertically movable with shaft 21. This casing 25 is connected by lug 27a to suitable mechanical lifting gearing 27, and to motor 28 so that casing 25 may be mechanically raised and lowered away from the glass ribbon 10 thus raising and lowering platen 17.

In lower surfacing apparatus 16 similar components are likewise used to drive the lower platen 29 which has a felt face 30. A bell crank arrangement 31, similar to the arrangement 19 above, at each end of platen 29 is connected to each shaft 32. Each shaft 32 by gearing 33 and shafts 34 is connected to a motor 35 whereby a curvilinear translation movement is imparted to platen 29. Likewise motor 36 through shafts 37, gearing 38 and further shafts 39 is connected to the casing 40, through which the shaft 32 passes and within which it is held for free rotation so that the lower platen 29 may also be lowered away and out of engagement from the glass ribbon 10 or moved upwardly in order to engage the ribbon 10. Since the detailed structure of the drive mechanism forms only an ancillary portion of this invention only that structure deemed essential for an understanding of the basic features of the operation of the platens 17 and 29 has been shown and described.

Connected to the casing 25 of the upper surfacing apparatus 15, is a fluid pressure system the specific one illustrated being hydraulic pressure system including pressure devices 41 and 42. By means of these devices 41 and 42, the polishing pressure is applied to thrust the surfacing tool 17 positively against ribbon 10. It is believed that the description of one of these devices will serve the purpose of describing both inasmuch as both devices 41 and 42 are identical. An L-shaped arm 43 is pivoted at a shaft 44. This arm 43 has a toothed projection 45 on one end engaging complementary teeth 46 on the casing 25. The plunger 47 of the device 42 is connected to the other end of arm 43 and carries a piston head 48 that is held within a cylindrical hydraulic cylinder 49.

This cylinder is what might be commonly referred to as having a double acting piston. The cylinder 49 in the embodiment shown is connected by means of suitable leads 50 and 51 to a source of vacuum and/or pressure in order to raise or lower plunger 47 as desired. Therefore, as the plunger or piston 47 is optionally driven, for example, downwardly in the direction of arrow 52 by inserting pressure into cylinder 49 from lead 50 and simultaneously bleeding pressure out through lead 51, casing 25 and platen 17 will be lifted up from the glass, to decrease the polishing pressure, by arm 43 pivoting about shaft 44. In the alternative, if piston 47 is raised in the direction of arrow 53 by inserting pressure through lead 51 and simultaneously bleeding pressure out through lead 50, then casing 25 will be forced downwardly by pivoting arm 43 to press the platen 17 against the ribbon 10 and therefore increase the polishing pressure.

Since the lower platen 29 in both the above circumstances would previously have been brought into fixed contact with the glass ribbon by motor 36, the application of thrust or polishing pressure on the top platen 17 will pinch the glass 10 between the felt face 18 of the upper platen 17 and the felt face 30 of the lower platen 29. At this time the platens 17, 29 would be in surfacing position and by proper regulation of the pressure in the hydraulic system 41 and 42 it would be possible to place and maintain the proper surfacing pressure upon the glass ribbon and thereby to properly surface the glass ribbon 10 which passes between the surfacing felts 18 and 30. The hydraulic system 41 and 42 therefore applies the positive load pressure which is used to surface the glass and the load pressure is applied after the tools or platens have been placed in engagement with the glass by operation of motors 28 and 36.

Turning now to FIGS. 4 and 5, there is shown in detail a rectangular polishing platen 17. It must be remembered, however, that this platen 17 is identical to the platen 29 so that a description of one, it is believed, will suffice as a description of both. The platen 17 includes a base plate 54 onto which the felt 18 has been attached. Cut into this felt 18, and running transversely of the path of glass movement or parallel to the long dimension of the rectangular plates configuration are a pair of rectangular slots 55 and 56. It should be here pointed out that the number and the size of these slots are a function of the platen size most particularly, that is the required number of slots will be used in order to achieve distribution of the surfacing medium without reducing the total glass engaging area of the platen necessary to achieve efficient polishing. As seen in FIG. 5 these slots 55 and 56 run from a position or location terminating slightly short of, or removed from, the side edges 57 and 58 of felt 18. This is necessary so that when this platen 17 is brought into contact with the surface of ribbon 10, the glass will completely cover slots 55 and 56 so that neither slot 55 nor 56 will extend beyond the opposite edges 59 and 60 (FIG. 1) of the glass ribbon 10 when the platen 17 follows its curvilinear translation. Therefore, since the ribbon 10 is pressed between these opposed polishing pads 17 and 29, slots 55 and 56 will define a pair of hollow chambers sealed off from free communication with the atmosphere.

It should be here noted that while the working face or rubbing layer of platens 17 and 29 have been described as being composed of felt, other resilient materials such as fibrous composition, rubber or a soft plastic would also be satisfactory. It is a basic requirement only that the materials used have the necessary combination of rigidity and flexibility so that it can follow minute irregularities in the glass surface being polished.

Figure 6:
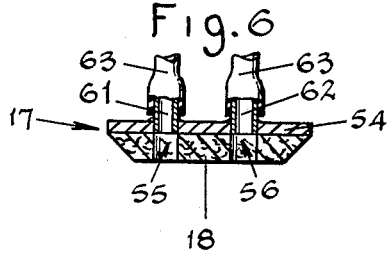
FIG. 6 is a sectional view taken along the lines 6—6 of FIG. 4.

Turning to FIG. 6, there is connected into each of the slots 55 and 56, nipples 61 and 62 which freely communicate with the slots. These nipples 61 and 62 provide four feed sources in the platen 17 through which slurry may be fed. It is likewise noted that depending upon the size and inherent weight of the platens that more feed sources might be found desirable. Thus the actual number of feed sources is dependent to a large extent upon the physical size and inherent weight of the platen. The polishing medium is fed through these nipples 61 and 62, as will later be described, to feed the polishing felts and to actually impregnate the felt pads with the polishing medium.

Turning now to FIG. 3, the nipples 61 and 62 are connected by means of flexible hoses 63 to a feed conduit 64. It is believed a description of the action for the feed system for the platens at station A will suffice for the similar system used in conjunction with the platens at station B. The feed conduit 64 defines, with the flexible hoses 63, feed nipples 61 and 62 and the slots 55 and 56 within the felt 18, a closed circuit for effecting slurry distribution to the felt to impregnate it.

Slurry is fed to the conduit 64 and to conduit 65 by a pump 66. Conduit 65 feeds the lower platen 29 in the same fashion as does conduit 64 above described feed platen 17, that is through flexible hoses 67. Pump 66 when activated forces slurry at a pressure between approximately 12 and 60 p.s.i. through the conduit 68 to conduit 64. The platen pressure at this time is held between about 2 and 8 p.s.i. The pump 66 is activated by a motor 69 connected to a timer 70. The same arrangement is duplicated at station B which has a timer 71, a motor 72 connected to the timer 71, a pump 73 and a similar feed system including conduits 74, 75 and 76 and flexible hoses 77. Pumps 66 and 73 are both fed by conduits 78 from a common reservoir 79 containing the fluid polishing medium.

The timers 70, 71 may also be synchronized so that motors 69 and 72 are activated at the same instant. In this case polishing slurry will flow from a common source 79 under positive pressure through the pumps 66 and 73 to all of the upper platens 17 and all of the lower platens 29 at both stations A and B at the same instant. Rather than using the timer to activate the pump intermittently a constant feed pump could be used in combination with solenoid valves.

It is believed desirable to mention here that there are a number of procedures wherein the surfacing units may be fed. First, considering the surfacing unit construction of FIG. 3, that is wherein a surfacing unit includes both a station A and a station B, i.e. four platens, two on the top and two on the bottom of the glass ribbon, this unit may be fed in any one of the following manners:

(1) Slurry may be simultaneously fed to only the two surfacing platens engaging the top ribbon surface.

(2) Slurry may be simultaneously fed to only the two surfacing platens engaging the bottom ribbon surface.

(3) Slurry may be simultaneously fed to one platen 17 in the top position and its opposed complementary platen 29 in the lower position.

When any one of the above procedures as outlined are followed, it has been found that disengagement of the platens from the glass ribbon does not produce any adverse effects which would unbalance the forces acting on the glass ribbon. It is desirable to prevent any unbalanced forces because they might possibly induce lateral shifting of the glass. Thus it is essential when feeding the glass surfacing platens, as aforedescribed in detail, that a proper balance be maintained throughout the polishing system.

It should also be noted that under the third alternate procedure above listed it would be possible to feed all of the platens at the same instant. That is, as shown in FIG. 3, the platens at station A could be fed to disengage them from the glass ribbon at the same instant the platens at station B were also fed to disengage them from the glass ribbon. However, if desired, it would be possible to feed the upper and lower surfacing members or platens at station A at a different time interval than the same members at station B of the same unit. It should also be pointed out here that if one platen of the four platen units is fed then at least one other platen must be fed, either the platen on the same side of the glass ribbon or the platen directly thereopposed. Thus, an even number of platens must always be fed as compared to an odd number.

Turning now to the situation wherein a surfacing unit is composed of only two platens, i.e., only station A, then in this specific case both the top and bottom platens must be fed at the same time. It has been recognized that it is possible to use a surfacing unit composed of only two platens, one on the top and one on the bottom when it is for some reason desirable to operate such a two platen unit independent of any other surfacing unit of similar construction.

It should also be noted that the piping system 64 and 65 for station A and system 75 and 76 for station B can be constructed to insure a correct pressure development in platens 17 and 29 and to overcome any pressure drop due to the variations in the length of the system delivering the slurry to either platen 17 or platen 29.

As was before discussed, the polishing pads or platens 17 and 29 are pressed downwardly onto the glass ribbon 10 by the hydraulic devices 41 and 42. At this time the closed chambers in the platens (i.e. those chambers defined by slots 55 and 56 and ribbon 10) would receive the slurry or polishing medium coming through the conduit or feed systems above described at a given pressure developed by a pump.

In the description which follows a discussion will be confined to the slurry feeding operation at station A. This feeding operation is controlled by a timer 70, which may or may not be synchronized with the other timer 71 controlling the pump 73 at station B. In any event the slurry feed causes the platens at station A to separate from the glass 10, that is to move from the position shown in FIG. 2 to the position shown in FIG. 3.

In order to initiate this movement of ribbon 10 and the slurry feed, timer 70 activates a motor 69 which causes the pump 66 to operate sending the slurry from reservoir 79 through the conduit systems aforedescribed and into the slots 55 and 56 of the opposed platens 17 and 29 at station A. As this slurry pressure in the platens builds up, it will overcome the thrust of the polishing pressure of the hydraulic system 41 and 42. As the slurry pressure, constantly increasing, exceeds the polishing or load pressure of system 41 and 42, platen 17 will be lifted from glass ribbon 10 by the pressure applied through conduit 64. At the same instant, the slurry pressure being applied through conduit 65 to the lower platen 29 will tend to force the glass ribbon 10 to be lifted up and away from the lower platens 29. At the instant the slurry pressure exceeds the load or polishing pressure at a maximum figure, it could be said that glass ribbon 10 is floated away from both upper platen 17 and lower platen 29 by the slurry pressure. That is ribbon 10 is floated upwardly away from the lower platen 29 in a bath of slurry while simultaneously top platen 17 is floated in a similar liquid bath upwardly away from the top surface of the glass ribbon. At this time the slurry in slots 55 and 56 of both platens 17 and 29 will spread outwardly therefrom and across the entire surface of the ribbon, between the ribbon 10 and the surface of the polishing felts on the platens. When this occurs, that is when the platens have been disengaged from the glass thereadjacent and when slurry has covered all parts of the glass opposite a platen 17 or 29 thus feeding or impregnating the felt pads thereadjacent, timer 70 will cause the pump 66 to be deactivated. This eliminates the pressure tending to cause the separation of the platens 17 and 29 from the glass ribbon 10. At this time the pressure of the hydraulic system 41 and 42 will again press downwardly on the upper platen 17 and will tend to force the upper platen 17 downwardly against the upper surface of glass ribbon 10. Thus the ribbon 10 will be forced downwardly towards the lower platen 29 and will again assume the position as shown in FIG. 2 wherein the glass ribbon is pinched between the opposed upper and lower platens.

Now referring to FIG. 3, when the platen 17 is fully raised by the slurry pressure and ribbon 10 floated away from the lower platen 29, the glass ribbon 10 is actually bent slightly. However this bend in the ribbon 10 does not exceed a vertical movement of more than a maximum of one hundred thousandths of an inch. So long as drive rolls 13, 14 are not positioned too close to the platens themselves, this upward glass movement will not cause any glass breakage. In practice it has been found that a relationship does exist between the magnitude of the vertical movement or elevation of the glass and the distance between the point of this vertical elevation and the nearest point of fixed pressure.

For example, referring to FIG. 3 the dotted line 80 represents the normal position of the lower surface 81 of glass ribbon 10 when the ribbon is being surfaced by the adjacent platens 17 and 29. This is the position shown in FIG. 2. When slurry is fed as aforedescribed it causes the platens 17 and 29 to be disengaged from the ribbon and the undersurface 81 of the glass ribbon 10 is elevated to the full line position shown in FIG. 3. Now the magnitude of the allowable vertical movement is a function of the span between the platens at one station and the adjacent platens at another station of the same surfacing unit, if only one station of the unit is fed, or the span between any platen being fed by slurry and the mid-point of the adjacent rolls 13 and 14.

For example, we have found that for a vertical elevation of ⅛ inch, breakage of the ribbon takes place at an average span of 8.5 inches or from 6 to 11 inches. We have further found that for a vertical elevation of ¼ inch, breakage occurs at an average of 13.5 inches or in the range of 10 to 16 inches and for a vertical elevation of ⅜ inch, breakage occurs at an average span of 16.5 inches or from 14 to 19 inches.

As above noted, our elevation is somewhere in the neighborhood of one hundred thousandths of an inch or just slightly less than ⅛ inch. The distance therefore between a drive roll 13 and 14 and the nearest adjacent platen should be slightly more than 11 inches in order to insure that the ribbon will not break when feeding stations A and B simultaneously. Likewise, if it is desired to feed the two platens at station A at sometime other than simultaneously with the two platens at station B, the span between the closest edges of any two of the platens at adjacent stations A and B should also always be more than 11 inches.

Thus the ribbon 10 moving in the direction of arrow 11 is bowed to move from the dotted line position to the full line position of FIG. 3 as the ribbon passes between and is floated away from the opposed surfacing platens during the above described feeding phase. However the ribbon will not break so long as the span between the feed point and an adjacent positive pressure area is controlled as above described. This platen feed is not a constant or continuous feeding system but as above described it is an intermittent system wherein slurry is caused to be pumped to the platens 17 and 29 for a period of time of approximately 10 to 20 seconds at intervals of approximately 120 to 200 seconds.

Thus the platens 17 and 29 under the action of suitable drive mechanisms are caused to follow a closed directive curve as aforedescribed. The hydraulic system 41 and 42 thrusts the upper platen 17 against the glass ribbon 10 at a load pressure of approximately 2 to 8 p.s.i. The feed of the slurry from reservoir 79 to the conduits as above discussed, maintains a pressure of between 10 and 12 p.s.i. for the slurry on the glass interiorly of the platens at stations A and B for the time period aforementioned. This time has been found to be the time normally required to float the platens as aforedescribed and to cause the slurry to sweep from the channels 55 and 56 across the felt surfaces of the platens to accomplish what might be referred to as a regenerating felting action. If the pressure exerted by the slurry on the glass exceeds 12 p.s.i. there is a tendency for the slurry to wash across the glass resulting in what might be termed a flushing out action.

In way of summary, this intermittent feed is controlled by timers 70 and 71 to insure that there is an ample supply of polishing medium at all times over the surface of the glass whereby the polishing felts 18 and 30 are periodically saturated with a fluid polishing medium. This is important since when driving the surfacing runners 17 and 29 along their curvilinear translation at high speeds, extreme heat results from the frictional contact between the felt and the glass. This extreme heat, if not compensated for at regular intervals, would induce conditions under which the glass ribbon might be broken and also would further cause excessive felt wear. In order to alleviate this condition, the felts 18 and 30 are regularly saturated with a polishing medium by periodically and intermittently raising the felts off and away from the glass and causing slurry to flow outwardly from the center of the platens to form a pool of a slurry between the felt and the glass. The impregnated patens overcome the frictional heat and it is possible to rotate the platens 17, 30 continuously at high speeds.

It is also noted that by feeding the platens 17 and 29 in the above described manner so as to intermittently saturate the felts 18 and 30 by slurry flowing from the center of the platens, the total effective polishing time or the polishing work will of course, be reduced. This has not been found to detract from the efficiency of the present apparatus for, or method of, surfacing glass since by positively insuring uniform slurry distribution across the surface of the ribbon and a well saturated surfacing felt, it has been possible to achieve uniform surfacing of the glass ribbon and to overcome numerous deficiencies present in the prior art that had materially detracted from a uniform glass finish.

While there has been aforedescribed and outlined the procedures by which it is possible to distribute a slurry under the polishing pads by varying the slurry pressure, this is not intended to limit the invention solely to such a method.

Thus it should be pointed out that it would be entirely possible to cause a disengagement of both the upper and lower surfacing platens from the glass ribbon by decreasing the pressure of hydraulic system 41 and 42 while retaining a constant slurry feeding pressure.

Under these circumstances, the platens would always be receiving slurry forced through the aforedescribed conduit system at a pressure on the glass of approximately 1 to 2 p.s.i. When it was desirable to disengage the platen or platens from the glass ribbon the load pressure exerted by hydraulic system 41 and 42 would be reduced from a normal range of between 2 and 8 p.s.i. to somewhere in the neighborhood of 0 to 2 p.s.i. By so reducing the pressure thrusting the platen 17 against the glass ribbon 10 and by introducing the slurry at a constant feeding pressure, the upper platens 17 would be forced away from the ribbon 10 and the ribbon 10 would be lifted from the bottom platens 29. This follows because of the fact that as the pressure exerted by hydraulic system 41 and 42 was reduced below the level necessary to overcome the feed pressure, the feeding pressure would have a sufficient forcing effect to move the platens in the manner aforedescribed.

Therefore in the broadest sense this invention is directed to the novel concept of overcoming the forces normally urging the tools into engagement with the glass ribbon and forcing the tools away from and off of the glass ribbon so that slurry fed internally of the polishing platens will spread outwardly and impregnate all of the glass engaging portions of both the upper and lower tools.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. A method of simultaneously surfacing both sides of a continuous glass ribbon moving along a definite path between and in engagement with the working face of a pair of opposed surfacing tools, the working face of one tool of each pair engaging the upper surface of the glass ribbon and the working face of the other tool engaging the lower surface of the glass ribbon, the steps of moving the tools according to a circular translatory motion, periodically disengaging the working faces of both surfacing tools from the surfaces of the glass ribbon, feeding a fluid surfacing medium onto the glass surface while said tools are so disengaged from the surfaces of said glass ribbon and re-engaging both surfacing tools with the surfaces of the glass ribbon upon termination of the feeding of the polishing medium.

2. A method of surfacing glass as defined in claim 1, wherein the surfacing tools are disengaged from the glass ribbon at intervals spaced between approximately 120 to 200 seconds apart.

3. A method of surfacing glass as defined in claim 1, wherein the surfacing medium is fed for a period of between approximately 10 to 20 seconds.

4. A method of surfacing glass as defined in claim 1, including feeding the surfacing medium from a source exterior of the tools and through the interior of the tools so the medium will flow outwardly on the surfaces of the glass from a point below the tools and towards the perimeter of the tools.

5. A method of simultaneously surfacing both sides of a continuous glass ribbon moving along a definite path between and in engagement with the working face of opposed surfacing tools, wherein a plurality of pairs of surfacing tools are arranged to engage the opposite surfaces of the glass ribbon, the said tools being arranged in groups of four comprising, two opposed tools engaging the upper surface of the glass ribbon and two opposed tools engaging the lower surface of the glass ribbon, the steps of disengaging both of the tools of any one group on only one side of the glass ribbon from contact with the glass surface there opposite, maintaining the remaining opposed tools on the other side of the glass ribbon in engagement with the other surface of said ribbon, feeding a polishing medium into only the exposed space between the disengaged surfacing tools and the ribbon surface thereopposite, and re-engaging said disengaged surfacing tools with said ribbon surface upon termination of the feeding of the polishing medium.

6. A method of distributing fluid polishing medium to all working surface areas of the glass engaging face of a surfacing tool wherein the glass engaging face of the tool has an opening formed therein, the steps of substantially sealing the opening by thrusting the tool under pressure into engagement with the glass surface, and periodically introducing a fluid polishing medium under pressure into the opening to overcome the thrust pressure and to force the polishing tool to be raised away from the glass surface so that the polishing medium will flow between the glass surface and the raised tool glass engaging face.

7. A method of distributing fluid polishing medium to all working surface areas of the glass engaging face of a surfacing tool as defined in claim 6, including thrusting the tool against the glass by a thrust pressure of between 2 and 8 p.s.i. while simultaneously introducing the fluid polishing medium to exert a pressure of between 10 and 12 p.s.i. on the glass.

8. A method of distributing fluid polishing medium to all working surface areas of the glass engaging face of a surfacing tool, wherein said glass engaging face has an opening formed therein, the steps of substantially sealing the opening by thrusting the tool into engagement with the glass surface, maintaining a fluid polishing medium under pressure in said opening and reducing the pressure thrusting the tool against the glass to the point where the pressure exerted by the fluid medium on the glass exceeds the thrust pressure and the tool is raised upwardly from the glass surface so that the polishing medium will flow between the glass surface and the raised tool glass engaging face.

9. A method of distributing fluid polishing medium to all working surface areas of the glass engaging face of a surfacing tool as defined in claim 8, including maintaining a constant fluid medium pressure of approximately 2 p.s.i. on the glass and reducing the thrust pressure to less than 2 p.s.i. to disengage the glass engaging face of the surfacing tool from the glass surface.

10. In a method of simultaneously surfacing the opposed surfaces of glass ribbon moving between successive pairs of opposed rectangular surfacing tools, said tools being moved according to a circular translatory motion and wherein the working face of the opposed surfacing tools are made of felt, the steps of thrusting the tools against the opposed surfaces of the glass ribbon under positive pressure, periodically disengaging at least two opposed tools from the glass ribbon, flowing a liquid fluid medium to the space between the felt working face and the glass ribbon, when the tool is disengaged from the ribbon, to saturate the felt working face with the liquid solution, and thereafter re-engaging said disengaged tools with the glass ribbon.

11. In a method of simultaneously surfacing the opposed surfaces of a glass ribbon as defined in claim 10, wherein the surfacing tools are periodically disengaged from the glass ribbon by the pressure force of the fluid polishing medium.

12. In a method of simultaneously surfacing the opposed surfaces of a glass ribbon as defined in claim 10, wherein the working face of the tool has an opening formed therein, which opening is substantially sealed by bringing the tool into bearing engagement with the glass ribbon, the steps of forcing a fluid pressure medium into the opening in the working face at a constant pressure, thrusting the working face against the glass at a variable pressure and reducing the thrust pressure below the value of the fluid pressure when it is desired to disengage the surfacing tool from the glass ribbon.

13. In a method of simultaneously surfacing the opposed surfaces of a glass ribbon as defined in claim 10, wherein the working face of the tool has an opening formed therein, which opening is substantially sealed by bringing the tool into bearing engagement with the glass ribbon, the steps of forcing a polishing medium under pressure into the said opening, thrusting the tool against the glass ribbon under pressure and causing the fluid polishing medium pressure exerted on the glass to exceed the thrust pressure when it is desired to disengage the tool from the glass ribbon.

14. In a method of feeding a fluid polishing medium to the opposed tools of a pair of surfacing tools, which tools are thrust against the opposite surface of a glass ribbon passing therebetween under a positive pressure, the steps of feeding a polishing medium through the interior of the lower surfacing tool to exert on the glass a pressure greater than the pressure thrusting the tool against the lower glass surface to force the glass ribbon to be raised upwardly from said lower surfacing tool, simultaneously feeding polishing medium through the interior of the upper surfacing tool to exert on the glass a pressure greater than the pressure thrusting the upper tool against the upper surface of the glass ribbon to force the upper tool to be raised upwardly away from the glass ribbon and discontinuing the introduction of the polishing medium through both the upper and lower polishing tools after the polishing medium has flowed across all portions of the glass opposite to both the lower and upper surfacing tools.

References Cited in the file of this patent

UNITED STATES PATENTS

| | | |
|---|---|---|
| 2,417,680 | Decker | Mar. 18, 1947 |
| 2,491,510 | Miller | Dec. 20, 1949 |
| 2,859,565 | Javaux | Nov. 11, 1958 |
| 2,882,650 | Price et al. | Apr. 21, 1959 |
| 2,910,813 | De Vore | Nov. 3, 1959 |
| 2,935,823 | Heymes | May 10, 1960 |
| 2,936,555 | Junge | May 17, 1960 |
| 2,937,480 | Peyches | May 24, 1960 |
| 3,036,410 | Hoyet et al. | May 29, 1962 |